(12) United States Patent
Alexandrov (10) Patent No.: US 8,384,298 B2
(45) Date of Patent: Feb. 26, 2013

(54) RESONANT INVERTER WITH SLEEP CIRCUIT

(75) Inventor: Felix I. Alexandrov, Bedford, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 179 days.

(21) Appl. No.: 12/861,243

(22) Filed: Aug. 23, 2010

(65) Prior Publication Data

US 2011/0043122 A1  Feb. 24, 2011

Related U.S. Application Data

(60) Provisional application No. 61/235,724, filed on Aug. 21, 2009.

(51) Int. Cl.
  *H05B 41/16* (2006.01)
  *H02M 7/48* (2007.01)
(52) U.S. Cl. .......................... 315/246; 363/97
(58) Field of Classification Search .................. None
  See application file for complete search history.

(56) References Cited

U.S. PATENT DOCUMENTS

| 2004/0036525 | A1* | 2/2004 | Bhagavatheeswaran et al. ............ 327/534 |
| 2008/0122388 | A1* | 5/2008 | Kuo et al. ............ 315/308 |
| 2008/0258640 | A1 | 10/2008 | Masuda |

FOREIGN PATENT DOCUMENTS

| JP | 2002-043088 A | 2/2002 |
| JP | 2008-204717 A | 9/2008 |
| KR | 10-2004-0032304 A | 4/2004 |
| KR | 10-2006-0096743 A | 9/2006 |

OTHER PUBLICATIONS

Chang Gyun Kim, International Search Report and Written Opinion for PCT/US10/46300, Feb. 28, 2011, pp. 1-6, Korean Intellectual Property Office, Daejeon, Republic of Korea.

* cited by examiner

*Primary Examiner* — Crystal L Hammond
(74) *Attorney, Agent, or Firm* — Shaun P. Montana (57) ABSTRACT

A sleep circuit for use in a resonant inverter is disclosed. The sleep circuit activates a "sleep mode" (non-continuous operation) when the inverter output has no connected load, or a connected load is non-operative (e.g., fails). The "sleep mode" utilizes hysteresis control via the under voltage lockout protection feature of a control IC of the inverter. A primary DC source permanently connects to the Vcc pin of the control IC for startup (on) and burst (non-continuous) operation modes. An auxiliary DC source connects to the Vcc pin via a switch for continuous operation mode. A load current sensor controls the switch. When a sensed output current is above a threshold level, the switch connects the auxiliary DC source, and the control IC (and the inverter) operates continuously. When the sensed output current falls below the threshold, the auxiliary DC source is not provided and the inverter operates in "sleep mode".

11 Claims, 5 Drawing Sheets

RESONANT INVERTER WITH SLEEP CIRCUIT

CROSS-REFERENCE TO RELATED APPLICATION

The present application claims priority of U.S. Provisional Patent Application Ser. No. 61/235,724, filed Aug. 21, 2009, the entire contents of which are hereby incorporated by reference.

TECHNICAL FIELD

The present invention relates to power supplies, and more specifically, to power supplies used to operate lamps.

BACKGROUND

A typical gas discharge lamp utilizes an electronic ballast to convert AC line voltage to a high frequency current capable of powering the gas discharge lamp. The main component of such an electronic ballast is a resonant DC/AC inverter, which is typically a series resonant DC/AC inverter driven by a control integrated circuit (IC) chip.

A single electronic ballast may power a plurality of lamps placed in a fixture including the electronic ballast. When replacing one or more lamps, or when one or more lamps are damaged, the resonant DC/AC inverter of the electronic ballast should operate without a load being present. During the startup period of a lamp, that is, when the lamp first starts, and particularly during instant starting, that is, without starting the lamp without first preheating the lamp, the electronic ballast operates in a no load condition for some interval of time. Electronic ballasts should output a high frequency starting voltage, for example, up to 1000V rms (root mean squared), to instant start one or more fluorescent lamps. For high intensity discharge (HID) lamps, the electronic ballast should output an even higher starting voltage. A higher output voltage by the electronic ballast during the startup period, including instant starting, is required to compensate for voltage losses in cables or wires connecting remote lamps to the electronic ballast. Industrial wires and connectors used in lighting application are typically rated for a maximum of 600V rms continuously applied. In a no load condition, the output voltage of the electronic ballast may exceed this number.

Excepting voltage stress on components, another obstacle for continuous no load operation is a higher power loss concentrated in the transistors of the inverter and in a resonant inductor. Even total ballast power loss typically does not exceed the same under a full load. U.S. Pat. No. 7,372,215 issued to Sekine et al. teaches avoiding an open circuit mode in a multi-lamp ballast by sensing the conductivity of a lamp via lamp filaments, and shutting down the inverter when no load is connected. The system taught by the '215 patent requires additional wires between each lamp and the ballast. U.S. Pat. Nos. 6,952,085 and 6,975,076, both issued to Nerone, disclose a control block for pulse inverter operation during starting as well as open circuit. These blocks include a pulse-width modulated (PWM) controller IC, such as a UC3861 from Texas Instruments recommended by the disclosures, a control transformer, and other active and passive components. The systems taught by the '085 and '076 patents detect open circuit conditions by having a resonant tank clamping circuit activated. U.S. Pat. No. 6,326,740 issued to Chang et al. discloses a no load voltage fed resonant inverter in a multiple-lamp ballast having over-voltage control with a flip-flop. This over-voltage control provides an on/off pulse inverter operation via an over-voltage feed back loop. The flip-flop provides a stable on/off inverter operation in sleep mode. However, the systems taught by the '085 and '076 patents feature an indirect detection of no load conditions via an output voltage sense features signal delay, which requires use of many complex surrounding circuits and ICs. A similar rms voltage limiting feature during lamp startup is used in an HID ballast according to U.S. Pat. No. 7,119,494 issued to Hui et al.

SUMMARY

Conventional techniques for pulsing a sleep mode of an electronic lamp ballast, such as those described above, involve multiple circuit components and configurations. Such large numbers of components used within sleep mode circuits, as well as their complex configurations, result in increased costs for including sleep mode circuits in electronics. These increased costs manifest throughout the development, production, and usage of an electronic ballast. Sleep mode circuits that include a large number of components not only increase the initial monetary cost of electronic ballasts, but also result in more possible failure points throughout the life of the electronic ballast. This may, in turn, lead to increased maintenance costs. In other words, the more components a circuit of an electronic ballast has, the greater the possibility of some component failing, and the longer it takes to find and replace the failed component.

Embodiments of the present invention provide a simple, inexpensive, sleep circuit for power supplies that include a resonant inverter having an IC controller. The resonant inverter, in some embodiments, may be combined with a power factor controller in the same IC. Modern industry standard ICs for driving field effect transistors (FETs) inherently feature under voltage lock out (UVLO) with hysteresis for protecting switching FETs from low voltage gate signals. The IC turns off if its supply voltage Vcc falls below some level, such as 8V, and the IC turns on when Vcc rises to higher level, such as 9V. The hysteresis of under voltage lockout (typically 1V) allows burst IC operation similar to PWM control without any additional PWM and flip-flop circuitry. The sleep circuit detects an open circuit mode of the inverter by direct sensing a total inverter load current. A capacitor connected in series with lamps, for example a DC capacitor of an inverter resonant tank, may be used as a current sensor. In such situations, an AC ripple voltage across the DC capacitor is dependent on the total output current that includes a current of the lamps and a leakage current of the wires. Therefore, embodiments are simple to design, construct, and test, and do not require many components for implementation. Embodiments further provide no load on/off inverter operation by using a standard driving control IC, and in no load conditions, significantly reduce total power loss in the resonant inverter to, for example, almost below 1% of its nominal power, significantly reduce inverter rms output voltage and components stress, and are not sensitive to system leakage current. Embodiments also allow for simple switching of inverter operation modes from on/off to continuous and backwards.

Thus, in an embodiment, there is provided a resonant inverter. The resonant inverter includes: an inverter circuit, wherein the inverter circuit receives power from a power source to power a load; an inverter output, wherein the inverter output transmits power to a load coupled to the inverter output, wherein the power is received from the inverter circuit; a current sensor, wherein the current sensor detects a current in the load coupled to the inverter output; and a sleep circuit, wherein the sleep circuit controls the inverter circuit, and wherein the sleep circuit places the resonant inverter in a non-continuous mode of operation, such that power is not continuously transmitted from the inverter circuit via the inverter output to the load, when the current sensor detects a current in the load below a threshold current.

In a related embodiment, the current sensor may include a current sensor, wherein the current sensor may detect a current being provided to the load coupled to the inverter output. In another related embodiment, the current sensor may include a current sensor, wherein the current sensor may detect a current in the load coupled to the inverter output, and a charge pump circuit, wherein the charge pump circuit may be activated when the current sensor detects a current in the load coupled to the inverter output, and wherein the charge pump circuit may be inactive when the current sensor detects no current in the load coupled to the inverter output. In a further related embodiment, the resonant inverter may further include an auxiliary power supply, wherein the auxiliary power supply, when coupled to the sleep circuit, may provide power to the sleep circuit such that the sleep circuit maintains the resonant inverter in a continuous mode of operation, and wherein the auxiliary power supply, when decoupled from the sleep circuit, may provide no power to the sleep circuit such that the sleep circuit places the resonant inverter in a non-continuous mode of operation, and a comparator circuit having a first and second input and an output, wherein the charge pump circuit may be coupled to the first input and a reference signal may be coupled to the second input, and wherein the auxiliary power supply may be coupled to the output, such that, when the charge pump circuit is activated, the comparator may couple the auxiliary power supply to the sleep circuit, and when the charge pump circuit is inactive, the comparator may decouple the auxiliary power supply from the sleep circuit.

In another related embodiment, the sleep circuit may include an control integrated circuit, wherein the control integrated circuit includes under voltage lockout protection, wherein the control integrated circuit may control the inverter circuit, and wherein the control integrated circuit may place the resonant inverter in a non-continuous mode of operation, such that power is not continuously transmitted from the inverter circuit via the inverter output to the load, when the current sensor detects a current in the load below a threshold current. In a further related embodiment, the current sensor may include a current sensor, wherein the current sensor may detect a current in the load coupled to the inverter output; and a charge pump circuit, wherein the charge pump circuit may be activated when the current sensor detects a current in the load coupled to the inverter output, and wherein the charge pump circuit may be inactive when the current sensor detects no current in the load coupled to the inverter output. In a further related embodiment, the resonant inverter may further include an auxiliary power supply, wherein the auxiliary power supply, when coupled to the control integrated circuit, may provide power to the control integrated circuit such that the control integrated circuit maintains the resonant inverter in a continuous mode of operation, and wherein the auxiliary power supply, when decoupled from the control integrated circuit, may provide no power to the control integrated circuit such that the control integrated circuit places the resonant inverter in a non-continuous mode of operation; and a comparator circuit having a first and second input and an output, wherein the charge pump circuit may be coupled to the first input and a reference signal may be coupled to the second input, and wherein the auxiliary power supply may be coupled to the output, such that, when the charge pump circuit is activated, the comparator may couple the auxiliary power supply to the control integrated circuit, and when the charge pump circuit is inactive, the comparator may decouple the auxiliary power supply from the control integrated circuit. In a further related embodiment, the control integrated circuit may include the comparator circuit. In another further related embodiment, the comparator circuit may include a transistor, wherein the transistor may have a linear operating mode and an open operating mode, wherein the charge pump circuit may control the transistor such that, when the charge pump circuit is activated, the transistor may enter open operating mode and the auxiliary power supply may be coupled to the control integrated circuit, and when the charge pump circuit is inactive, the transistor may enter linear operating mode and the auxiliary power supply may be decoupled from the control integrated circuit.

In another embodiment, there is provided a ballast. The ballast includes a lamp and a resonant inverter, wherein the lamp is coupled to the output of the resonant inverter, and wherein the resonant inverter includes: an inverter circuit, wherein the inverter circuit receives power from a power source to power the lamp; an inverter output, wherein the inverter output transmits power to the lamp, wherein the power is received from the inverter circuit; a current sensor, wherein the current sensor detects a current in the lamp; and a sleep circuit, wherein the sleep circuit controls the inverter circuit, and wherein the sleep circuit places the resonant inverter in a non-continuous mode of operation, such that power is not continuously transmitted from the inverter circuit to the lamp, when the current sensor detects a current in the lamp below a threshold current.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
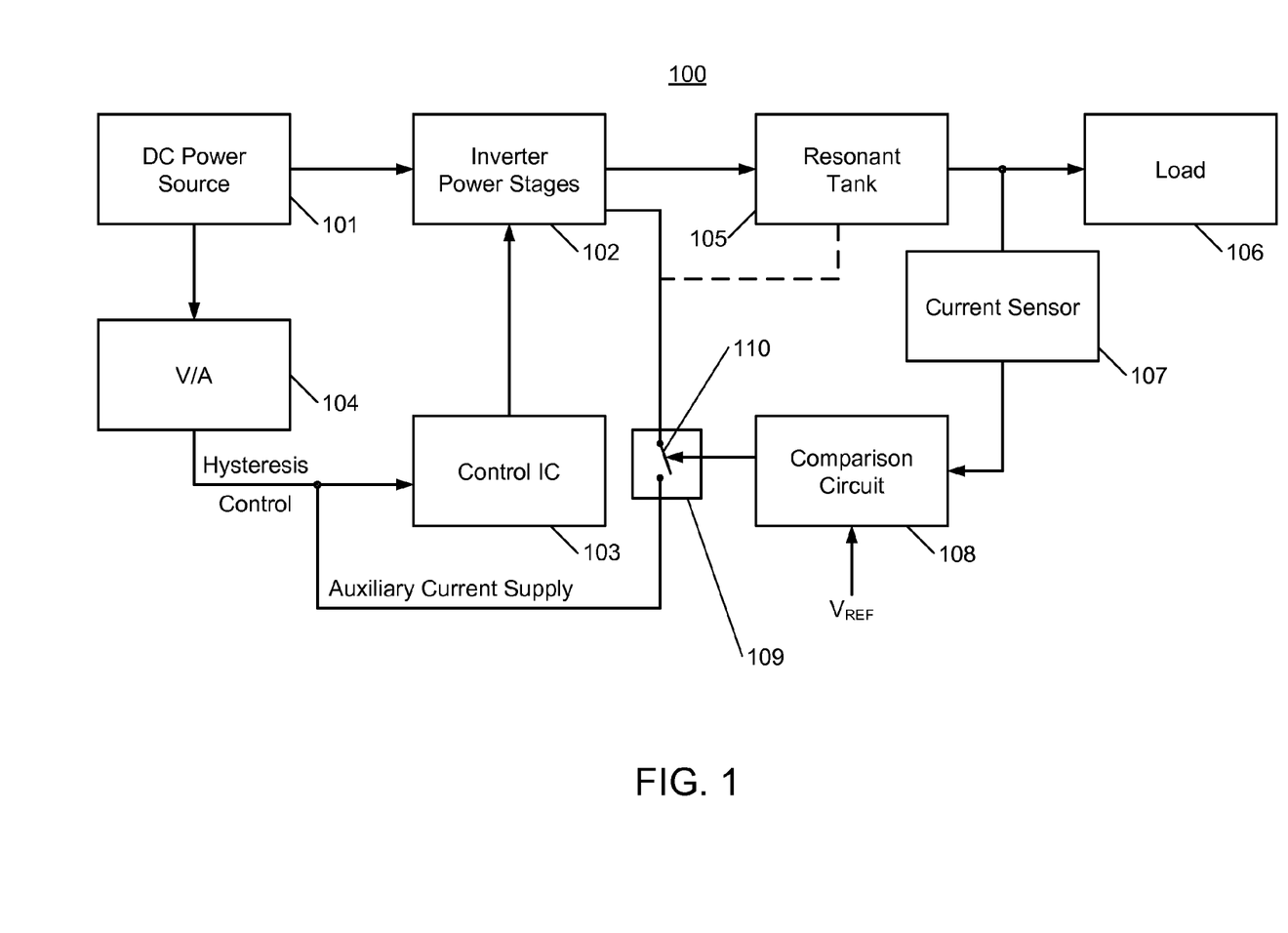
FIG. 1 shows a block diagram of a resonant inverter with a sleep circuit according to embodiments disclosed herein.

FIG. 1 shows a block diagram of a resonant inverter 100 including a control IC 103. In some embodiments, the control IC 103 may be referred to herein as a sleep circuit. Alternatively, or additionally, in some embodiments, the sleep circuit may include the control IC 103. A DC power source 1010 powers the resonant inverter 100. In some embodiments, the DC power source 101 may include an AC to DC converter, which is not shown in FIG. 1. In addition to the control IC 103, the resonant inverter 100 includes inverter power stages 102, such as but not limited to a half bridge configured with two FETs (not shown in FIG. 1) that the control IC 103 drives. Current consumption of the control IC 103 in under voltage lockout (UVLO) conditions is considered to be very low, such as but not limited to about 0.2-0.3 mA. The control IC 103 is coupled to the DC power source 101 via a voltage to current converter 104. A storage capacitor, not shown in FIG. 1, is connected between a Vcc pin and a ground pin (not shown) of the control IC 103. The voltage to current converter 104 supplies a small current, such as but not limited to 0.5-1 mA, to the Vcc pin of the control IC 103 to start the control IC 103. DC voltage from the DC power source 101 is converted to high frequency rectangular AC voltage, which is applied to a resonant tank 105. The resonant tank 105 boosts and filters out a first harmonic of the AC voltage. A load 106, which may be, but is not limited to, a gas discharge lamp, is coupled to the output of the resonant tank 105. In some embodiments, the load 106 is a plurality of gas discharge lamps up to and including four gas discharge lamps. In other embodiments, the load 106 is any number of lamps of any type, including but not limited to gas discharge lamps. A current sensor 107 senses an output current of the resonant tank 105, and in some embodiments, of the load 106, and generates a current sense output versus inverter output current. A comparison circuit 108 compares the current sense output with a reference Vref. The comparison circuit 108 controls an auxiliary current supply 109. The auxiliary current supply 109 is coupled to the inverter power stages 102 by the shown solid line in FIG. 1, or, in some embodiment, alternatively/additionally to the resonant tank 105 by the shown dotted line in FIG. 1. The auxiliary current supply 109 includes a switch 110 that enables or disables the auxiliary current supply 109 to provide power to the control IC 103. If the current sense output exceeds Vref, the comparison circuit 108 triggers the switch 110, enabling the auxiliary current supply 109 to power the control IC 103 (e.g., in a continuous mode of operation). Vref is selected so that the comparison circuit 108 will not trigger the switch 110 by wire to wire and wire to ground leakage current, and the resonant inverter 100 will operate in sleep mode. Vref is further selected so that if some load current appears, the comparison circuit 108 will trigger the switch 110, enabling the auxiliary current supply 109 to power the control IC 103 (and thus to control it). The control IC 103 will then continuously drive the inverter power stages 102.

Figure 2:
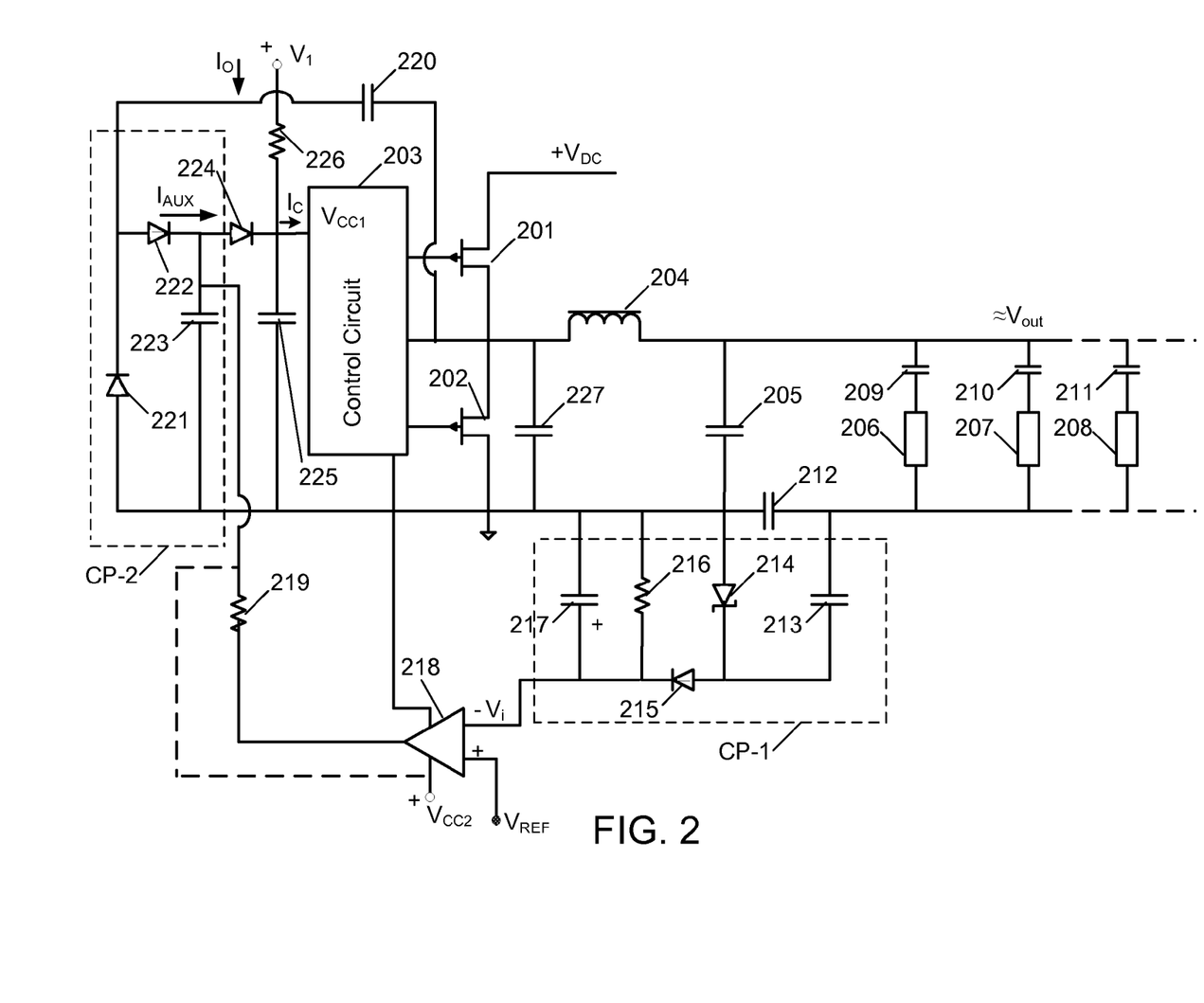
FIG. 2 illustrates a circuit diagram of an embodiment used for a multi-lamp ballast resonant inverter with a control IC.

FIG. 2 illustrates the resonant inverter 100 shown in FIG. 1 in greater detail as a series resonant inverter 200 (that is, an electronic ballast inverter) that powers lamps, which in some embodiments are fluorescent lamps and/or other types of gas discharge lamps. Neither the resonant inverter 100 shown in FIG. 1 nor the series resonant inverter 200 shown in FIG. 2 are limited to lamps and/or ballasts only, and can be used with any variable load coupled to an output of the inverter, such as but not limited to an AC/DC rectifier for powering a DC load. Further, the number of loads/lamps and their various possible connections are similarly not limited.

The series resonant inverter 200 comprises switching transistors, such as but not limited to FETs 201 and 202 shown in FIG. 2. A control IC 203 drives the switching transistors 201 and 202, and is provided with an internal OVSD circuit that is not shown in FIG. 2. An IC supply voltage is sensed at a Vcc1 pin of the control IC 203 by the above OVSD circuit inside the control IC 203. When the IC supply voltage sensed at the Vcc1 pin becomes low, the OVSD circuit disables the control IC 203 (i.e., turns it off and/or operates the control IC 203 in burst (sleep) mode). The series resonant inverter 200 also includes an inverter resonant tank built from a resonant inductor 204 and a resonant capacitor 205 connected in series. This series circuit is connected in parallel to the switching transistor 202. The series resonant inverter 200 generates a high frequency AC voltage, ~Vout. A load on the series resonant inverter 200 is comprised of gas discharged lamps 206, 207, and 208, each connected in parallel to the resonant capacitor 205 via a corresponding boost capacitor 209, 210, and 211, with a DC blocking capacitor 212 connected to a common terminal of the series resonant inverter 200 and in series with the load. In FIG. 2, the switching transistors 201 and 202 are configured in half bridge inverter mode but other resonant inverter topologies can be, and in other embodiments are, used. The DC blocking capacitor 212 is also utilized as a load current sensor. A voltage ripple across the DC blocking capacitor 212 energizes a first charge pump circuit CP-1. The first charge pump circuit CP-1 includes a capacitor 213 and diodes 214 and 215, and is loaded with a resistor 216 and a smoothing capacitor 217. A voltage comparator with a hysteresis 218 is used to compare an output Vi from the first charge pump with a reference voltage Vref. A comparator voltage supply pin Vcc2 does not require a regulated voltage and optionally can be connected to a second charge pump circuit CP-2. To limit voltage Vi applied to a negative input of the voltage comparator 218, a Zener type diode 214 can be used in the first charge pump circuit CP-1. The reference voltage Vref is applied to a positive input of the voltage comparator 218. A current limit resistor 219 is connected to an output of the voltage comparator 218. In some embodiments, the voltage comparator 218 is an open collector voltage comparator such as a TS391 from ST Micro Electronics or a similar type comparator. In some embodiments, the voltage comparator 218 and its surrounding components are incorporated in the control IC 203.

Referring back to FIG. 1, the control IC 103 is provided with the auxiliary current supply 109. In FIG. 2, this auxiliary current supply is built as the second charge pump circuit CP-2. The second charge pump circuit CP-2 comprises a capacitor 220 connected to a common junction of the switching transistors 201 and 202, diodes 221 and 222, and a smoothing output capacitor 223. The output of the second charge pump circuit CP-2 is coupled to the output of the voltage comparator 218 with a series current limit resistor 219. The second charge pump circuit CP-2 supplies the Vcc1 pin of the control IC 203 with an auxiliary current Iaux flowing via a cut off diode 224. A storage capacitor 225 is connected to the Vcc1 pin of the control IC 203 for its stable operation. An initial current Io for the control IC 203 starting comes from a primary DC voltage source V1 via a resistor 226. A supply current into the pin Vcc1 of the control IC 203 ranges from 5 to 10 mA, depending of the type of driven switching transistors 201 and 202 and their switching frequency. To supply current to the control IC 203 via the capacitor 220 corresponding to the above demand, an optional capacitor 227 for inverter optimized Zero Voltage Switching (ZVS) is connected across the switching transistor 202.

The series resonant inverter 200 starts by the control IC 203 that energizes the switching transistors 201 and 202. If no current in the DC blocking capacitor 212 is sensed, the current sense output Vi at the output of the first charge pump circuit CP-1 remains low, so that the voltage comparator's 218 output voltage also remains low, and current supply to the control IC 203 from the second charge pump circuit CP-2 is redirected to a ground of the control IC 203. When a load current is sensed, a DC voltage current sense output Vi appears across the resistor 216 and the smoothing capacitor 217. The output Vi at the negative input of the voltage comparator 218 should exceed the reference voltage Vref to keep the output of the voltage comparator 218 open, so the second charge pump circuit CP-2 provides the auxiliary current Iaux to the Vcc1 pin of the control IC 203 via diode 224 for continuous inverter operation.

Figure 2A:
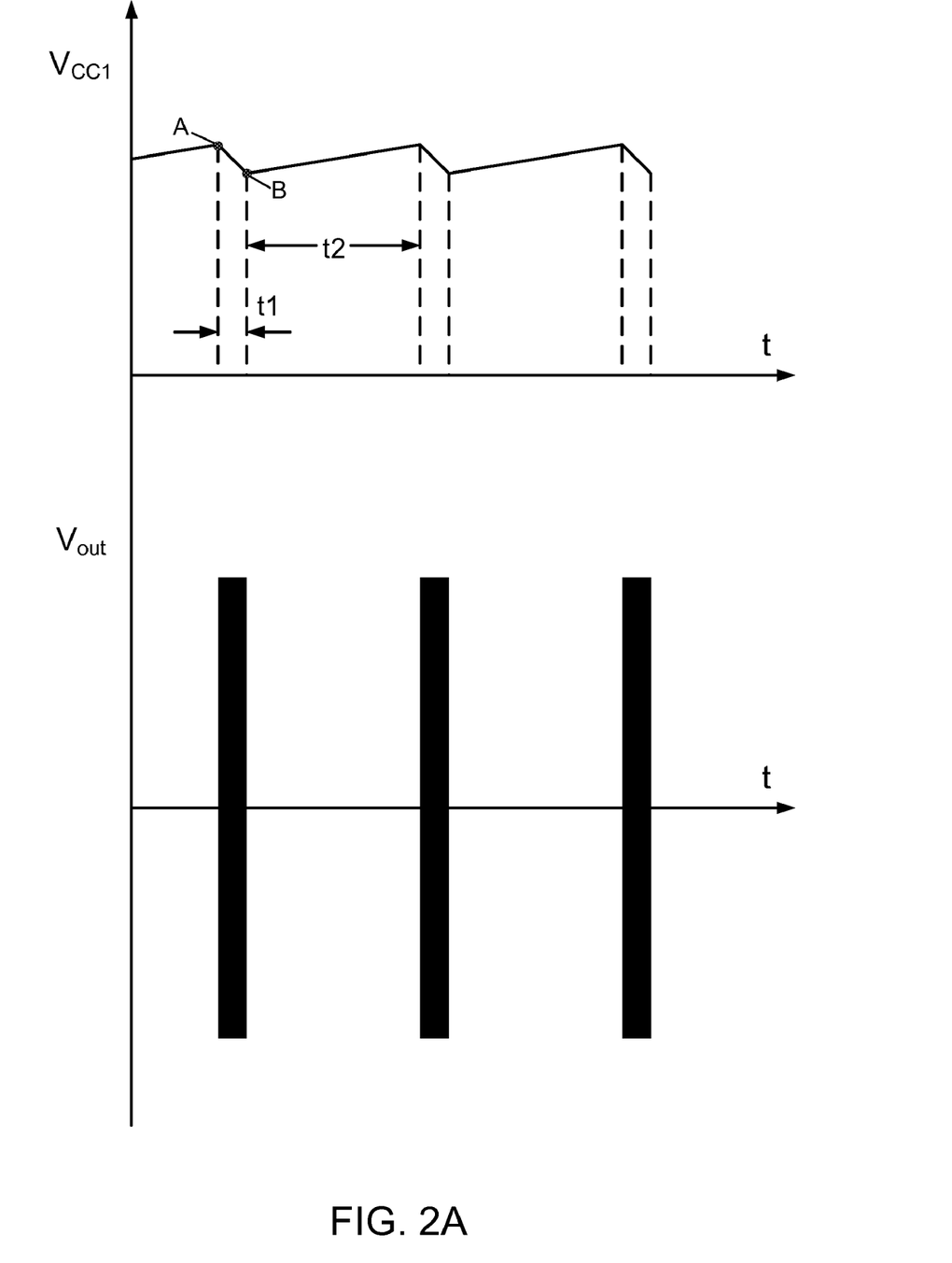
FIG. 2A shows signal wave forms of the resonant inverter shown in FIG. 2, in no load conditions.

FIG. 2A illustrates inverter burst operation in no load mode. Voltage Vcc1 is the voltage applied, for example, to the Vcc1 pin of the control IC 203 shown in FIG. 2. Voltage Vcc1 is regulated by hysteresis control provided by the UVLO circuit of the control IC 203. The UVLO circuit turns the control IC 203 on when Vcc1 achieves a level "A" shown in FIG. 2A and turns the control IC 203 off when Vcc1 falls to a lower level "B" shown in FIG. 2A. The storage capacitor 225 is charged during a time interval t2 by a current Io from the DC primary voltage source V1, and it is discharged to the control IC 203 during a time interval t1 with a supply current Ic. During the time interval t1, a high frequency high voltage Vout is generated at the output of the resonant series inverter 200. The control IC 203 current consumption is negligible (that is, low) during the time interval t2, so that a duty ratio of the inverter bursting D is determined as D=t1/(t1+t2)=Io/(Ic−Io). Accordingly, in burst no load operation, inverter power loses and rms output voltage is in D times less than in imaging no load continuous operation. For instance, in a series resonant inverter such as the series resonant inverter 200 shown in FIG. 2, power loss in continuous no load operation is at least 10% of inverter nominal power. This loss can overheat and damage some parts, such as the switching transistors 201 and 202 and especially the resonant inductor 204 and the resonant capacitor 205. With Io=0.5 mA and Ic=5 mA, this loss for the resonant series inverter 200 shown in FIG. 2 is about 10 times less. With a 4.7 uF value of the storage capacitor 225 and a 1-2V hysteresis of the UVLO circuit of the control IC 203, the time interval t2 in FIG. 2A is about 2-4 ms, and bursting frequency is about 50-25 Hz correspondingly.

Figure 2B:
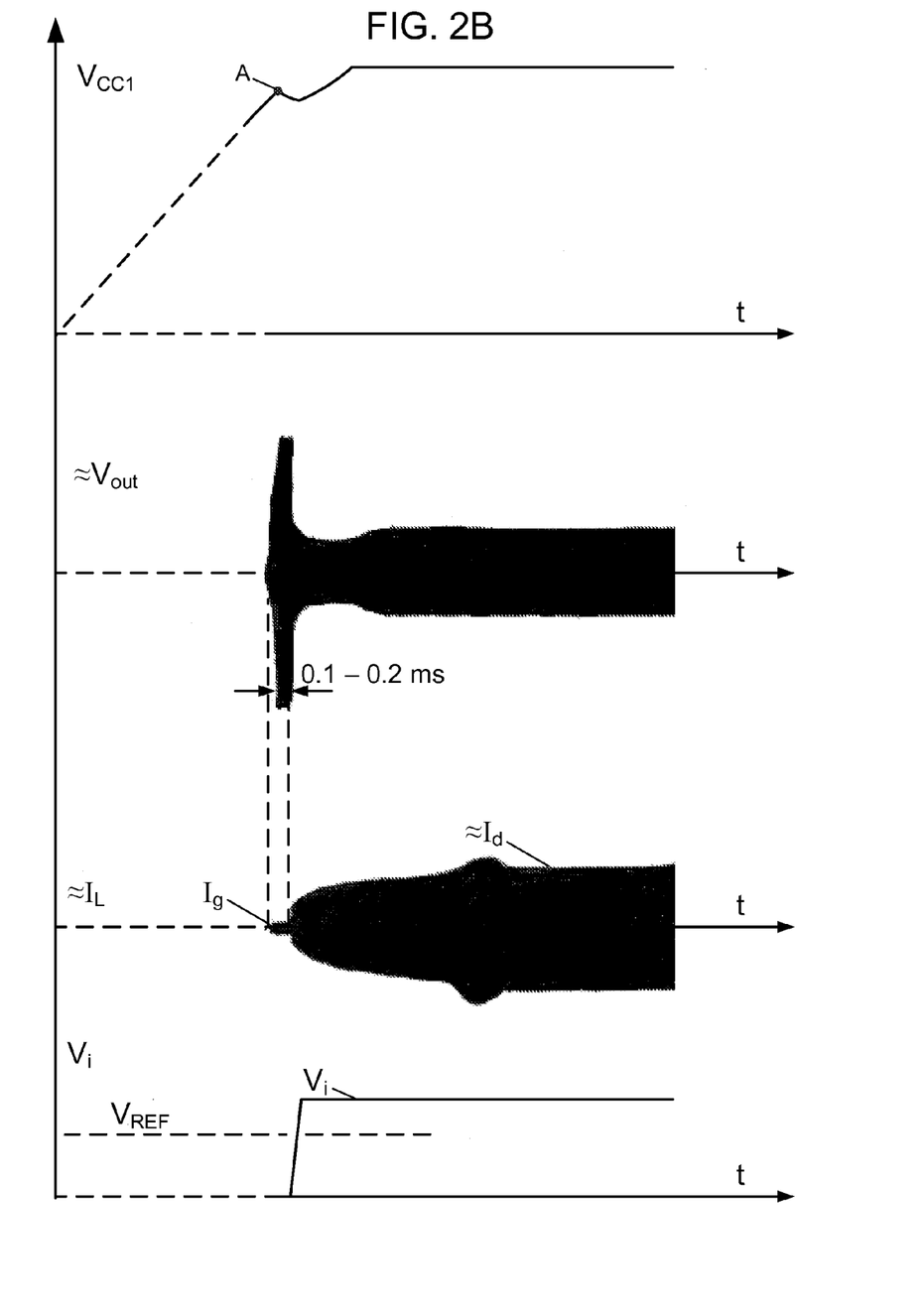
FIG. 2B shows signal wave forms of the resonant inverter shown in FIG. 2, in starting and steady state modes in loaded conditions.

FIG. 2B illustrates inverter instantly starting with gas discharge lamps as shown in FIG. 2. With the storage capacitor 225 charged from the DC primary voltage source VI via the resistor 226, the control IC 203 remains in sleep mode. When voltage Vcc1 achieves turn on at a level "A" of the UVLO circuit inside the control IC 203, an IC oscillator (not shown in FIG. 2) is turned on. The switching transistors 201 and 202 start switching and generating high AC voltage Vout at the inverter output. The generated high AC voltage ignites lamps 206, 207, and 208. This high frequency voltage generates very low glow current in the lamps. The glow current Ig time interval lasts about 0.1-0.2 ms, then gas breaks and the lamp discharge current Id instantly sets up in the lamp, as shown in FIG. 2B. With at least one lamp connected to the ballast, the current sense output Vi exceeds reference Vref at the inputs of the voltage comparator 218, therefore, its output remains open. The second charge pump circuit CP-2 is not blocked from supplying to pin Vcc1 sufficient auxiliary current Iaux for continuous control IC 203 operation. If lamps have, for any reasons, difficulties starting during the first ignition burst, strikes will continue until at least one of the lamps will start. For resonant inverter loads different from gas discharge lamps, such as AC/DC rectifiers, the series resonant inverter 200 will always operate continuously from the very beginning In this case, the value of the storage capacitor 225 can be selected in 1-2 orders less than for gas discharge lamps.

Figure 3:
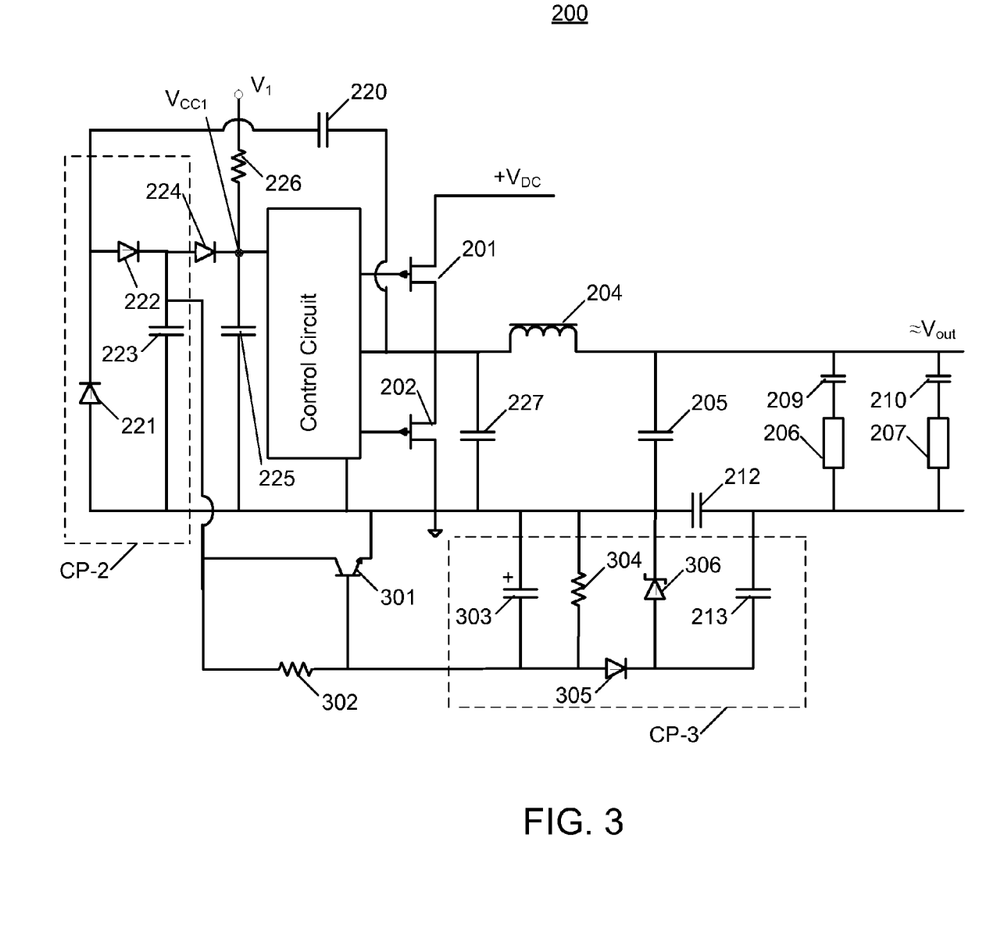
FIG. 3 illustrates embodiments utilizing a transistor to control a charge pump auxiliary current supply.

FIG. 3 illustrates an inverter 300 with a particular control IC 203, such as but not limited to an L6569 control IC, an IRS2153D control IC, etc. Instead of using a voltage comparator, such as the voltage comparator 218 shown in FIG. 2, a transistor 301 is used for switching an auxiliary current supply from the charge pump circuit CP-2. A control output for a transistor 301 is provided by a current sense charge pump circuit CP-3 built with output capacitors 303, a resistor 304, and diodes 305 and 306. The current sense charge pump circuit CP-3, in contrast to the charge pump circuit CP-1 shown in FIG. 2, delivers a negative reflecting inverter load current. In no load conditions, the output of a charge pump circuit CP-2 (capacitor 223) is preloaded by the transistor 301 operating in linear mode, so a voltage across the capacitor 223 is less than the voltage at pin Vcc1, and the control IC 203 and the inverter 300 operate in burst pulsing mode. When, at least one of lamps 206, 207 is under full current, a negative voltage generated by the current sense charge pump circuit CP-3 changes the polarity of the control output applied to the transistor 301 that becomes open. After that, the inverter 300 operates in continuous mode.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A resonant inverter, comprising:
   an inverter circuit, wherein the inverter circuit receives power from a power source to power a load;
   an inverter output, wherein the inverter output transmits power to a load coupled to the inverter output, wherein the power is received from the inverter circuit;
   a current sensor, wherein the current sensor detects a current in the load coupled to the inverter output and wherein the current sensor includes a charge pump circuit, wherein the charge pump circuit is activated when the current sensor detects a current in the load coupled to the inverter output, and wherein the charge pump circuit is inactive when the current sensor detects no current in the load coupled to the inverter output;
   a sleep circuit, wherein the sleep circuit controls the inverter circuit, and wherein the sleep circuit places the resonant inverter in a non-continuous mode of operation, such that power is not continuously transmitted from the inverter circuit via the inverter output to the load, when the current sensor detects a current in the load below a threshold current;
   an auxiliary power supply, wherein the auxiliary power supply, when coupled to the sleep circuit, provides power to the sleep circuit such that the sleep circuit maintains the resonant inverter in a continuous mode of operation, and wherein the auxiliary power supply, when decoupled from the sleep circuit, provides no power to the sleep circuit such that the sleep circuit places the resonant inverter in a non-continuous mode of operation; and
   a comparator circuit having a first and second input and an output, wherein the charge pump circuit is coupled to the first input and a reference signal is coupled to the second input, and wherein the auxiliary power supply is coupled to the output, such that, when the charge pump circuit is activated, the comparator couples the auxiliary power supply to the sleep circuit, and when the charge pump circuit is inactive, the comparator decouples the auxiliary power supply from the sleep circuit.

2. The resonant inverter of claim 1, wherein the current sensor comprises:
   a current sensor, wherein the current sensor detects a current being provided to the load coupled to the inverter output.

3. The resonant inverter of claim 1, wherein the sleep circuit comprises:
   an control integrated circuit, wherein the control integrated circuit includes under voltage lockout protection, wherein the control integrated circuit controls the inverter circuit, and wherein the control integrated circuit places the resonant inverter in a non-continuous mode of operation, such that power is not continuously transmitted from the inverter circuit via the inverter output to the load, when the current sensor detects a current in the load below a threshold current.

4. The resonant inverter of claim 3,
   wherein the auxiliary power supply, when coupled to the control integrated circuit, provides power to the control integrated circuit such that the control integrated circuit maintains the resonant inverter in a continuous mode of operation, and wherein the auxiliary power supply, when decoupled from the control integrated circuit, provides no power to the control integrated circuit such that the control integrated circuit places the resonant inverter in a non-continuous mode of operation; and
   wherein the comparator circuit comprises:
      a comparator circuit having a first and second input and an output, wherein the charge pump circuit is coupled to the first input and a reference signal is coupled to the second input, and wherein the auxiliary power supply is coupled to the output, such that, when the charge pump circuit is activated, the comparator couples the auxiliary power supply to the control integrated circuit, and when the charge pump circuit is inactive, the comparator decouples the auxiliary power supply from the control integrated circuit.

5. The resonant inverter of claim 4, wherein the control integrated circuit includes the comparator circuit.

6. The resonant inverter of claim 4 wherein the comparator circuit comprises a transistor, wherein the transistor has a linear operating mode and an open operating mode, wherein the charge pump circuit controls the transistor such that, when the charge pump circuit is activated, the transistor enters open operating mode and the auxiliary power supply is coupled to the control integrated circuit, and when the charge pump circuit is inactive, the transistor enters linear operating mode and the auxiliary power supply is decoupled from the control integrated circuit.

7. A ballast, comprising:
   a lamp; and
   a resonant inverter, wherein the lamp is coupled to the output of the resonant inverter, and wherein the resonant inverter comprises:
      an inverter circuit, wherein the inverter circuit receives power from a power source to power the lamp;
      an inverter output, wherein the inverter output transmits power to the lamp, wherein the power is received from the inverter circuit;
      a current sensor, wherein the current sensor detects a current in the lamp and wherein the current sensor includes a charge pump circuit, wherein the charge pump circuit is activated when the current sensor detects a current in the lamp, and wherein the charge pump circuit is inactive when the current sensor detects no current in the lamp;
      a sleep circuit, wherein the sleep circuit controls the inverter circuit, and wherein the sleep circuit places the resonant inverter in a non-continuous mode of operation, such that power is not continuously transmitted from the inverter circuit to the lamp, when the current sensor detects a current in the lamp below a threshold current;
      an auxiliary power supply, wherein the auxiliary power supply, when coupled to the sleep circuit, provides power to the sleep circuit such that the sleep circuit maintains the resonant inverter in a continuous mode of operation, and wherein the auxiliary power supply, when decoupled from the sleep circuit, provides no power to the sleep circuit such that the sleep circuit places the resonant inverter in a non-continuous mode of operation; and
      a comparator circuit having a first and second input and an output, wherein the charge pump circuit is coupled to the first input and a reference signal is coupled to the second input, and wherein the auxiliary power supply is coupled to the output, such that, when the charge pump circuit is activated, the comparator couples the auxiliary power supply to the sleep circuit, and when the charge pump circuit is inactive, the comparator decouples the auxiliary power supply from the sleep circuit.

8. The ballast of claim 7, wherein the sleep circuit comprises:
   an control integrated circuit, wherein the control integrated circuit includes under voltage lockout protection, wherein the control integrated circuit controls the inverter circuit, and wherein the control integrated circuit places the resonant inverter in a non-continuous mode of operation, such that power is not continuously transmitted from the inverter circuit via the inverter output to the lamp, when the current sensor detects a current in the lamp below a threshold current.

9. The ballast of claim 8, wherein the auxiliary power supply, when coupled to the control integrated circuit, provides power to the control integrated circuit such that the control integrated circuit maintains the resonant inverter in a continuous mode of operation, and wherein the auxiliary power supply, when decoupled from the control integrated circuit, provides no power to the control integrated circuit such that the control integrated circuit places the resonant inverter in a non-continuous mode of operation; and
   wherein the comparator circuit comprises:
      a comparator circuit having a first and second input and an output, wherein the charge pump circuit is coupled to the first input and a reference signal is coupled to the second input, and wherein the auxiliary power supply is coupled to the output, such that, when the charge pump circuit is activated, the comparator couples the auxiliary power supply to the control integrated circuit, and when the charge pump circuit is inactive, the comparator decouples the auxiliary power supply from the control integrated circuit.

10. The ballast of claim 9, wherein the control integrated circuit includes the comparator circuit.

11. The ballast of claim 9, wherein the comparator circuit comprises a transistor, wherein the transistor has a linear operating mode and an open operating mode, wherein the charge pump circuit controls the transistor such that, when the charge pump circuit is activated, the transistor enters open operating mode and the auxiliary power supply is coupled to the control integrated circuit, and when the charge pump circuit is inactive, the transistor enters linear operating mode and the auxiliary power supply is decoupled from the control integrated circuit.

* * * * *